US009373470B2

(12) United States Patent
Lisbona

(10) Patent No.: US 9,373,470 B2
(45) Date of Patent: Jun. 21, 2016

(54) ELECTRICAL RELAY WITH HEADER CONNECTORS

(71) Applicant: Lennox Industries Inc., Richardson, TX (US)

(72) Inventor: Randall Lee Lisbona, Coppell, TX (US)

(73) Assignee: Lennox Industries Inc., Richardson, TX (US)

( * ) Notice: Subject to any disclaimer, the term of this patent is extended or adjusted under 35 U.S.C. 154(b) by 425 days.

(21) Appl. No.: 13/957,399

(22) Filed: Aug. 1, 2013

(65) Prior Publication Data

US 2015/0035382 A1 Feb. 5, 2015

(51) Int. Cl.

| | |
|---|---|
| ***H02B 1/24*** | (2006.01) |
| ***B23K 11/24*** | (2006.01) |
| ***H01H 50/14*** | (2006.01) |
| *H01R 9/26* | (2006.01) |
| *H01R 13/64* | (2006.01) |

(52) U.S. Cl.

CPC .............. *H01H 50/14* (2013.01); *H01R 9/2633* (2013.01); *H01R 13/64* (2013.01); *Y10T 307/74* (2015.04)

(58) Field of Classification Search

CPC ............ Y10T 307/747; Y10T 307/766; Y10T 307/832; Y10T 29/49117; Y10T 307/773; Y10T 307/461; Y10T 307/696; Y10T 307/76; Y10T 307/852; Y10T 307/937; Y10T 29/49002

USPC .......................................................... 307/112

See application file for complete search history.

(56) References Cited

U.S. PATENT DOCUMENTS

| | | | | | |
|---|---|---|---|---|---|
| 4,362,916 | A * | 12/1982 | Anderson | H01H 13/20 | 200/332 |
| 5,057,026 | A * | 10/1991 | Sawai | H05K 7/026 | 439/43 |
| 5,131,455 | A * | 7/1992 | Tsuchiyama | F24F 1/027 | 165/240 |
| 5,524,448 | A * | 6/1996 | Schwanebeck | H02H 7/08 | 361/22 |
| 2004/0106333 | A1* | 6/2004 | Zhao | H01R 13/113 | 439/843 |
| 2004/0201320 | A1* | 10/2004 | Carson | H01H 55/00 | 310/328 |
| 2009/0081904 | A1* | 3/2009 | Wang | H01R 13/703 | 439/638 |
| 2013/0040500 | A1* | 2/2013 | Ngo | H01R 12/75 | 439/660 |

* cited by examiner

*Primary Examiner* — Jared Fureman
*Assistant Examiner* — Esayas Yeshaw
(74) *Attorney, Agent, or Firm* — R. Johnston Law, PLLC

(57) ABSTRACT

A disclosed electrical relay may include a line electrical terminal adapted for connection to an electrical conductor carrying an electrical voltage, a normally-closed connector and a normally-open connector each having a housing and multiple electrical terminals arranged within a cavity of the housing, and a switching element. The switching element is configured to electrically connect the line electrical terminal to at least one of the electrical terminals of the normally-closed connector when not enabled, and to electrically connect the line electrical terminal to at least one of the electrical terminals of the normally-open connector when enabled. The normally-closed connector and the normally-open connector may be tab header connectors, and may be adapted to receive plug connectors of different devices. The electrical relay may include two normally-open connectors each having three electrical terminals, where corresponding electrical terminals of the normally-open connectors are electrically connected to one another.

18 Claims, 4 Drawing Sheets

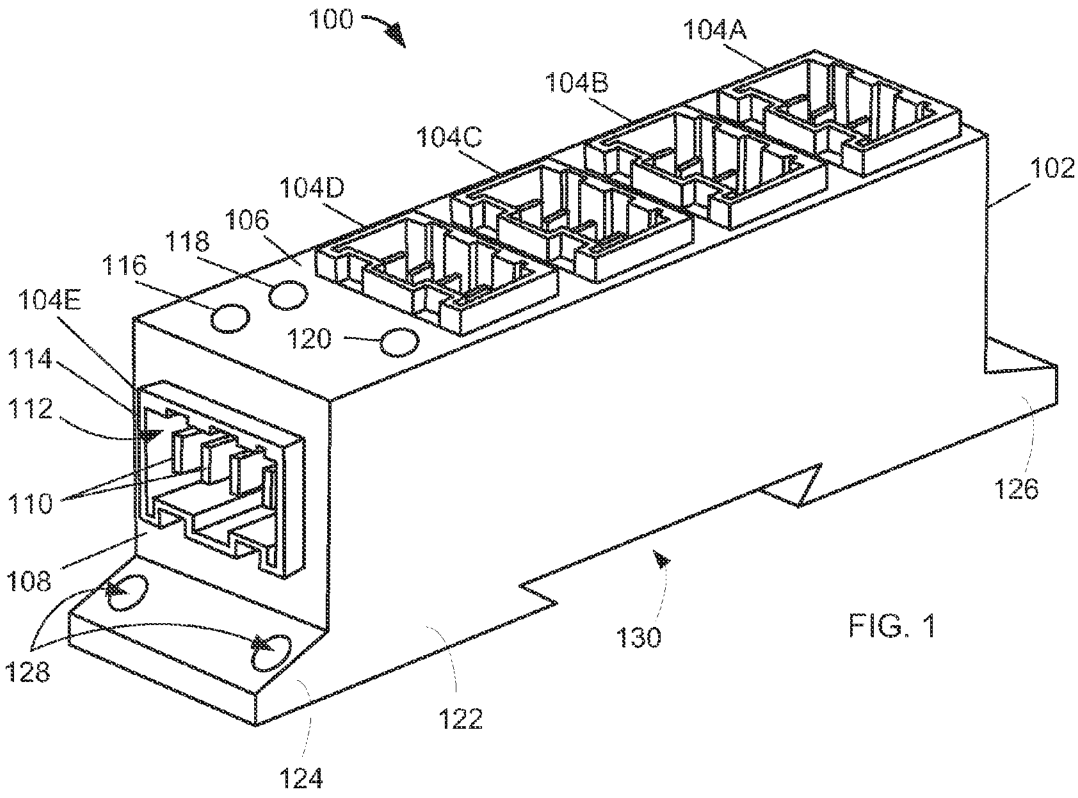
FIG. 1
FIG. 2
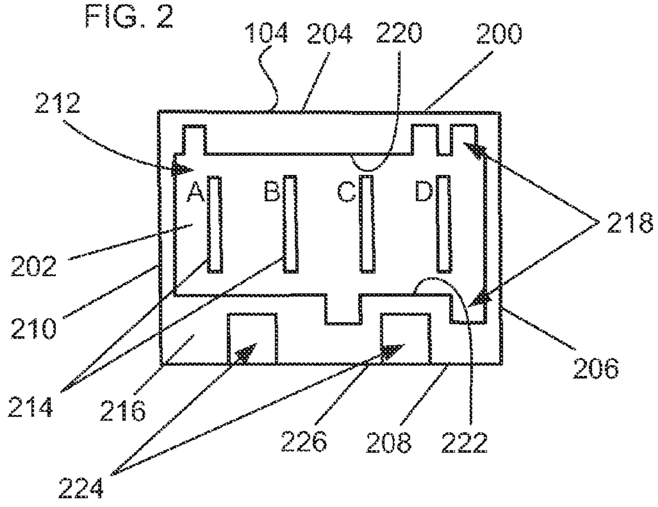

ELECTRICAL RELAY WITH HEADER CONNECTORS

BACKGROUND

1. Field of the Invention

The present invention relates to electrical switching devices and, more particularly, to an electrical relay utilized to selectively provide electrical power to one or more load devices.

2. Description of Related Art

An electrical relay is an electrically controlled switch used for selectively providing electrical power to one or more load devices. Relays are typically used for controlling a high current (or high voltage) circuit with a low current (or low voltage) signal. A typical electrical relay for selectively providing electrical power to one or more load devices has control terminals for connecting to a control circuit, line terminals for connecting to conductors providing electrical power (i.e., line conductors), and load terminals for connecting to one or more load devices. Load terminals are typically “normally-open” load terminals or “normally-closed” load terminals. Electrical voltage from the line conductors is applied to the normally-closed load terminals when a control signal is absent, and is not applied to the normally-closed load terminals when the control signal is present. The electrical voltage from the line conductors is not applied to the normally-open load terminals when a control signal is absent, and is applied to the normally-open load terminals when the control signal is present.

Relays with both normally-open and normally-closed load terminals are useful in many applications, including heating, ventilating, and air conditioning (HVAC) systems with refrigerant compressors. Compressors typically have crankcase heaters to prevent refrigerant migration and mixing with crankcase oil when the compressor is not running, and to prevent condensation of refrigerant in the crankcase. Crankcase heaters are often not required when the compressor is running, and since they are relatively large electrical loads, it is desirable to turn crankcase heaters off when the compressor is running. A relay with both normally-open and normally-closed load terminals can be used to control a compressor motor and a crankcase heater. With the compressor motor connected to the normally-open load terminals, the compressor motor will operate (i.e., run) only when the control signal is present. With the crankcase heater connected to the normally-closed load terminals, the crankcase heater will operate only when the control signal is absent (i.e., when the compressor motor is not running).

Relays are often used to control loads such as single phase permanent split capacitor (PSC) motors. A typical PSC motor has three leads—two line voltage leads (L1 and L2) and a “Start” lead for connection to a run capacitor. The line voltage leads are typically connected to a relay, and the “Start” lead is connected to one lead of the run capacitor. A second lead of the run capacitor is typically wired to one of the line voltage leads. Even with this relatively simple configuration, there are 120 (five factorial) ways to potentially wire the five leads, only one of which is correct.

A problem arises with relays in that if a wiring error is made when connecting a load device to a load terminal, such as during original assembly, when a faulty load device is replaced, or when a new load device is added, the wiring error may result in injury to a technician performing the work, damage to the relay or to the load device, and/or create an unsafe operating condition.

SUMMARY

The problems outlined above are at least in part addressed by a novel electrical relay that may include a line electrical terminal adapted for connection to an electrical conductor carrying an electrical voltage, a normally-closed connector and a normally-open connector each having a housing and multiple electrical terminals arranged within a cavity of the housing, and a switching element. The switching element is configured to electrically connect the line electrical terminal to at least one of the electrical terminals of the normally-closed connector when not enabled, and to electrically connect the line electrical terminal to at least one of the electrical terminals of the normally-open connector when enabled. The normally-closed connector and the normally-open connector may be tab header connectors, and may be adapted to receive plug connectors of different devices. The electrical relay may include two normally-open connectors each having three electrical terminals, where corresponding electrical terminals of the normally-open connectors are electrically connected to one another.

BRIEF DESCRIPTION OF THE DRAWINGS

A better understanding of the various disclosed embodiments can be obtained when the detailed description is considered in conjunction with the following drawings, in which:

FIG. 1 is a perspective view of one embodiment of an electrical relay;

FIG. 2 is a front view of a representative one of the tab header connectors of the relay of FIG. 1;

Figure 3:
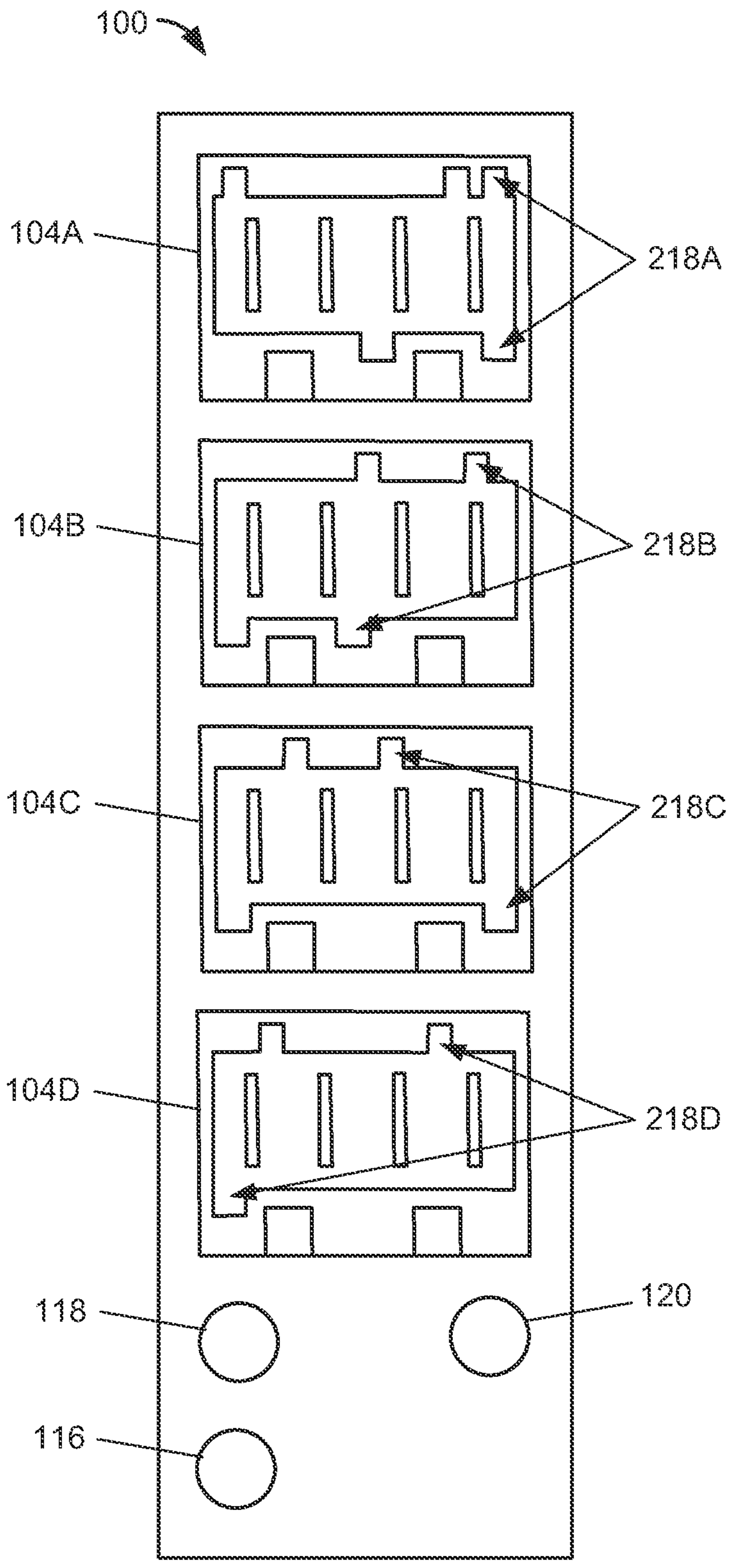
FIG. 3 is a top plan view of the relay of FIG. 1.

While the invention is susceptible to various modifications and alternative forms, specific embodiments are shown by way of example in the drawings and will be described in detail. It should be understood, however, that the drawings and detailed description are not intended to limit the invention to the particular form disclosed, but on the contrary, the intention is to cover all modifications, equivalents and alternatives falling within the spirit and scope of the invention as defined by the appended claims.

DETAILED DESCRIPTION

Turning now to the figures, FIG. 1 is a perspective view of one embodiment of an electrical relay 100. As described in detail below, the electrical relay 100 may include multiple header connectors each configured to accept a mating plug connector of a specific equipment item (e.g., load device), thereby eliminating wiring errors that may injure personnel, damage equipment, or create unsafe operating conditions. The relay 100 accommodates single phase motors that require a start capacitor. In some embodiments, the relay 100 includes jumpers to electrically connect tab terminals of individual tab header connectors for a motor and a motor start capacitor.

In the embodiment of FIG. 1, the relay 100 may include a housing 102 having four tab header connectors 104A-104D positioned in an upper surface 106, and another tab header connector 104E positioned in a front surface 108. Each of the tab header connectors 104A-104E has multiple spaced apart tab terminals arranged in a cavity. As shown in FIG. 1, the tab header connector 104E has four spaced apart tab terminals 110 arranged in a cavity 112 such that the tab terminals 110 are recessed within the cavity 112 with respect to an outer face 114 of the tab header connector 104E. The tab header connectors 104A and 104B are similar to the tab terminals tab header connectors 104C-104E, except that the tab header connectors 104A and 104B each have three tab terminals instead of four.

In the embodiment of FIG. 1, the relay 100 also includes a fault indicator 116, an enabled indicator 118, and a manual enable lever 120 positioned in the upper surface 106. The fault indicator 116 is a light emitting indicator (e.g., a light-emitting diode) that is illuminated when a fault condition is detected. The enabled indicator 118 is a light emitting indicator (e.g., a light-emitting diode) that is illuminated when the relay 100 is enabled. In other embodiments, the enabled indicator 116 may be a mechanical flag that is visible through a small window in the housing 102. In the embodiment of FIG. 1, the manual enable lever 120 is part of a mechanism that mechanically closes a pair of normally-open contacts, and mechanically opens a pair of normally-closed contacts.

In the embodiment of FIG. 1, the housing 102 has a base 122 opposite the upper surface 106 and adapted to allow the relay 100 to be mounted in different ways. The base 122 has a front ear 124 adjacent the front surface 108. The front ear 124 juts outward from the front surface 108 as shown in FIG. 1, and has two holes 128 for mounting the relay 100 to a flat surface (e.g., via screws). The base 122 also has a back ear 126 adjacent a back surface opposite the front surface 108. The back ear 126 juts outward from the back surface and also has two holes for mounting the relay 100 to a flat surface.

In the embodiment of FIG. 1, the base 122 of the housing 102 also has a groove 130 in a bottom surface of the housing 102 opposite the upper surface 106. Opposed sides of the groove 130 are slanted as shown in FIG. 1, and the groove 130 is dimensioned for mounting to a top hat Deutsches Institut für Normung (DIN) rail. The groove 130 conforms to the European (EN) 50022 standard for DIN rail mounting.

FIG. 2 is a front view of a representative one of the tab header connectors 104C-104E of the relay 100, labeled 104 in FIG. 2. As described above, the tab header connectors 104A and 104B are similar to the tab terminals tab header connectors 104C-104E, except that the tab header connectors 104A and 104B each have three tab terminals instead of four. The tab header connector 104 of FIG. 2 is representative of the tab header connectors 104A-104E. The representative tab header connector 104 includes an insulative housing 200 having a base 202 and four walls extending from the base 202: an upper wall 204, a lower wall 208, and two side walls 206 and 210. The base 202 and the four side walls 204, 206, 208, and 210 form a cavity 212 (e.g., the cavity 112 of the tab header connector 104E shown in FIG. 1). There are four spaced apart slots in the base 202, and four tab terminals 214 (e.g., the tab terminals 110 of the tab header connector 104E shown in FIG. 1) extend through the slots in the base 202. In FIG. 2, the four tab terminals 214 are labeled "A," "B," "C," and "D" from left to right. The four tab terminals 214 are recessed within the cavity 212 with respect to an outer face 216 of the representative tab header connector 104 (e.g., the outer face 114 of the tab header connector 104E shown in FIG. 1).

In the embodiment of FIG. 2, the terminals 214 include flat, rectangular mating "tab" portions made of an electrically conductive material (e.g., a metal), and are male terminals adapted to engage corresponding female terminals (e.g., of a plug connector). Other configurations of the terminals 214 are also possible. For example, in other embodiments the terminals 214 may be female terminals adapted to engage corresponding male tab terminals (e.g., of a plug connector). Other shapes of the mating portions of the terminals 214 are also possible. For example, in other embodiments the terminals 214 may be cylindrical "bullet" connectors adapted to engage corresponding female terminals.

In some embodiments, each of the tab header connectors 104A-104E of the relay 100 are configured to receive a corresponding plug connector (e.g., of a wiring harness). As shown in FIG. 2, multiple keying and/or polarization slots 218 are formed in an inner surface 220 of the upper wall 204, and in an inner surface 222 of the lower wall 208. Each of the tab header connectors 104A-104E may have one or more keying slots configured differently such that only a corresponding plug connector will fit in the tab header connector. For example, the tab header connectors 104A and 104B are similar, as are the tab header connectors 104C-104E. The tab header connector 104A may have one or more keying slots configured such that a plug connector configured to fit in the tab header connector 104B will not fit in the tab header connector 104A, and vice versa. Similarly, the tab header connector 104C may have one or more keying slots configured such that a plug connector configured to fit in one of the tab header connectors 104D-104E will not fit in the tab header connector 104C.

In the embodiment of FIG. 2, two latch windows 224 are formed in an outer surface 226 of the lower wall 208. Each of the latch windows 224 is configured to receive a male latch member of the corresponding plug connector. When the corresponding plug connector is inserted into the representative tab header connectors 104, the male latch member may engage the housing 200 and hold the plug connector in place.

In the embodiment of FIGS. 1-2, each of the tab header connectors 104A-104E conforms to the Raster Anschluss Steck Tecknik (RAST) standard for tab header connectors. In other embodiments some or all of the tab header connectors 104A-104E may or may not conform to a header connector standard. For example, in other embodiments some or all of the tab header connectors 104A-104E may include screw terminals or box lug terminals. The tab header connectors 104A-104E may also include one or more latching windows between adjacent tab terminals per the RAST standard.

FIG. 3 is a top plan view of the relay 100 of FIG. 1. Components of the relay 100 shown in FIGS. 1-2 and described above are numbered similarly in FIG. 3. As shown in FIG. 3, each of the tab header connectors 104A-104D is mechanically coded to receive a different plug connector. In FIG. 3, the multiple keying and/or polarization slots 218 of the tab header connector 104A are labeled "218A." Similarly, the multiple keying and/or polarization slots 218 of the tab header connectors 104B-104D are labeled "218B"-"218D," respectively. For example, a plug connector that fits in the tab header connector 104A has ridges on an outer surface that align with and fit into the keying and/or polarization slots 218 of the tab header connector 104A. The plug connector that is mechanically coded in this way to fit in the tab header connector 104A cannot physically be inserted into one of the other tab header connectors 104B-104D, preventing wiring mishaps that may damage equipment or pose safety problems.

Figure 4:
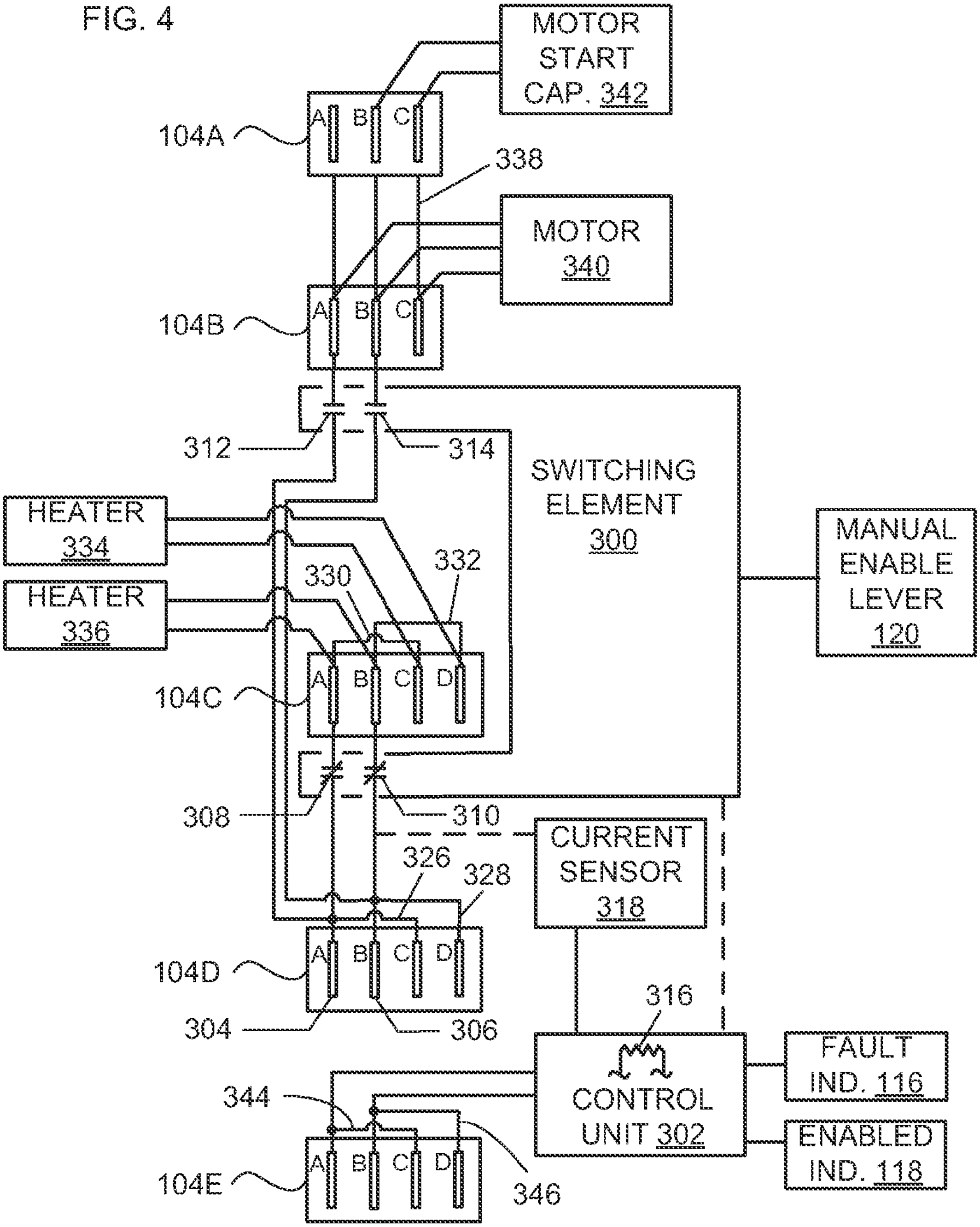
FIG. 4 is a wiring diagram of the relay of FIG. 1.

FIG. 4 is a wiring diagram of the relay 100 of FIG. 1. As indicated in FIG. 4, the relay 100 may also include a switching element 300 and a control unit 302. The control unit 302 may be coupled to the tab header connector 104E and to the switching element 300. The control unit 302 may receive a control signal (e.g., a voltage signal or a current signal) via the tab header connector 104E, and may control the switching element 300 in response to the control signal.

In the embodiment of FIG. 4, the tab header connector 104D includes two tab terminals 304 and 306 (also labeled "A" and "B," respectively). The tab terminals 304 and 306 are configured for connection to electrical conductors carrying electrical voltage. The electrical conductors may be, for example, alternating current line conductors carrying voltages that are 180 degrees out of phase.

In the embodiment of FIG. 4, a relatively short electrical conductor called a "jumper" 326 electrically connects the tab terminal "A" of the tab header connector 104D to the tab terminal "C" of the tab header connector 104D. An internal jumper 328 similar to the jumper 326 may connect the tab terminal "B" of the tab header connector 104D to the tab terminal "D" of the tab header connector 104D. This allows the electrical voltages carried by the line conductors and the tab terminals 304 and 306 to be routed to another device (e.g., another relay) via a plug connector (e.g., of a wiring harness) that mates with the tab header connector 104D. This action is often referred to as "twinning"

In the embodiment of FIG. 4, the switching element 300 is coupled between the tab header connector 104D and the tab header connectors 104A-104C. The switching element 300 performs a switching action that is illustrated by two pairs of contacts controlled by the control unit 302: a first pair of contacts 308 and 310, and a second pair of contacts 312 and 314. The contacts 308, 310, 312, and 314 are operated in unison. The switching element 300 may actually include the contacts 308, 310, 312, and 314, or electronic switching circuitry that performs the switching functions of the contacts 308, 310, 312, and 314.

The contacts 312 and 314 are normally-open contacts, and the contacts 308 and 310 are normally-closed contacts. When the relay 100 is not enabled, the contacts 312 and 314 are open and the contacts 308 and 310 are closed. The manual enable lever 120 is part of a mechanism that mechanically closes the normally-open contacts 312 and 314, and mechanically opens the normally-closed contacts 308 and 310.

When the contacts 308 are closed, the tab terminal 304 (terminal "A") of the tab header connector 104D is electrically connected a tab terminal "A" of the tab header connector 104C. When the contacts 310 are closed, the tab terminal 306 (terminal "B") of the tab header connector 104D is electrically connected to tab terminal "B" of the tab header connector 104C. The tab header connector 104C is thus termed a "normally-closed" connector.

When the relay 100 is enabled, the contacts 312 and 314 are closed and the contacts 308 and 310 are open. When the contacts 308 are open, there is no electrical connection between the tab terminal 304 (terminal "A") of the tab header connector 104D and the tab terminal "A" of the tab header connector 104C. Similarly, when the contacts 310 are open, there is no electrical connection between the tab terminal 306 (terminal "B") of the tab header connector 104D and the tab terminal "B" of the tab header connector 104C.

In the embodiment of FIG. 4, a jumper 330 electrically connects the tab terminal "A" of the tab header connector 104C to the tab terminal "C" of the tab header connector 104C. A jumper 332 similar to the jumper 330 connects the tab terminal "B" of the tab header connector 104C to the tab terminal "D" of the tab header connector 104C. This allows two loads such as compressor crankcase heaters, labeled "334" and "336" in FIG. 4, to be powered by the normally-closed tab header connector 104C when the relay 100 is not enabled.

In the embodiment of FIG. 4, an internal jumper electrically connects the tab terminal "A" of the tab header connector 104A to the tab terminal "A" of the tab header connector 104B, and another jumper may connect the tab terminal "B" of the tab header connector 104A to the tab terminal "B" of the tab header connector 104B. Accordingly, these internal jumpers may connect corresponding tab terminals "A" of the tab header connectors 104A and 104B to the contacts 312, and corresponding tab terminals "B" of the tab header connectors 104A and 104B to the contacts 314, in a serial or daisy-chain fashion. Another internal jumper, labeled "338" in FIG. 4 and described in more detail below, may connect the tab terminal "C" of the tab header connector 104A to the tab terminal "C" of the tab header connector 104B.

As described above, when the relay 100 is not enabled, the contacts 312 and 314 are open and no electrical connection exists between the tab terminals 304 and 306 (the tab terminals "A" and "B," respectively) of the tab header connector 104D and the tab header connectors 104A and 104B. Accordingly, the tab header connectors 104A and 104B are termed "normally-open" connectors.

When the relay 100 is enabled, the contacts 312 and 314 are closed. When the contacts 312 are closed, there is an electrical connection between the tab terminal 304 (terminal "A") of the tab header connector 104D and the tab terminals "A" of the tab header connectors 104A and 104B. Similarly, when the contacts 314 are closed, there is an electrical connection between the tab terminal 306 (terminal "B") of the tab header connector 104D and the tab terminals "B" of the tab header connectors 104A and 104B.

In the embodiment of FIG. 4, line terminals of a motor 340 (e.g., a single phase permanent split capacitor fan motor) may be connected to the terminals "A" and "B" of the tab header connector 104B, and a "Start" terminal may be connected to the terminal "C" of the tab header connector 104B. Terminals of a motor start capacitor 342 may be connected to the terminals "B" and "C" of the tab header connector 104A. The jumper 338, connecting the tab terminal "C" of the tab header connector 104A to the tab terminal "C" of the tab header connector 104B, provides a proper connection of the motor start capacitor 342 to the terminals of the motor 340.

In the embodiment of FIG. 4, the tab header connector 104A may have one or more keying slots (see FIG. 2) configured to accept a mating plug connector of the motor start capacitor 342, and the tab header connector 104B may have one or more keying slots configured to accept a mating plug connector of the motor 340. In this situation, the plug connector of the motor start capacitor 342 cannot physically be inserted into any one of the other tab header connectors 104B-104E, and the plug connector of the motor 340 cannot physically be inserted into any one of the other tab header connectors 104A and 104C-104E, thereby preventing wiring mishaps.

In the embodiment of FIG. 4, tab terminals "A" and "B" of the tab header connector 104E receive the control signal that enables the relay 100. An internal jumper 344 may electrically connect the tab terminal "A" of the tab header connector 104E to the tab terminal "C" of the tab header connector 104E. A similar jumper 346 may connect the tab terminal "B" of the tab header connector 104E to the tab terminal "D" of the tab header connector 104E. The internal jumpers 344 and 346 allow the control signal to be routed to another device (e.g., "twinned" to another relay) via a plug connector (e.g., of a wiring harness) that mates with the tab header connector 104E. When the control unit 302 receives the control signal via the tab header connector 104E, the control unit 302 may issue a signal to the switching element 300 to close the contacts 312 and 314 and to open the contacts 308 and 310.

In the embodiment of FIG. 4, the control unit 302 may include a coil 316. When the control unit 302 receives the control signal, electrical voltage may be applied to the coil 316, causing electrical current to flow through the coil 316, and creating a magnetic field around the coil 316. This magnetic field may be coupled to the switching element 300, causing the contacts 312 and 314 to close and the contacts 308 and 310 to open. When the magnetic field is not present around the coil 316, the contacts 312 and 314 are open and the contacts 308 and 310 are closed. In other embodiments, the switching element 300 and/or the control unit 302 may include semiconductor devices, and the relay mechanism including the switching element 300 and/or the control unit 302 may be a solid state relay mechanism.

In the embodiment of FIG. 4, the control unit 302 is coupled to the fault indicator 116 and the enabled indicator 118, and controls the fault indicator 116 and the enabled indicator 118. As described above, the fault indicator 116 and the enabled indicator 118 are light emitting indicators. The control unit 302 illuminates the fault indicator 116 when a fault condition is detected, and illuminates the enabled indicator 118 when the relay 100 is enabled.

In the embodiment of FIG. 4, the relay 100 also includes an optional current sensor 318. The current sensor 318 is coupled to a conductor (e.g., a wire) connected between the tab terminal 306 and the contacts 310 and 314, and to the control unit 302. The current sensor 318 senses electrical current in the conductor and provides a signal to the control unit 302 that is indicative of the electrical current in the conductor.

In some embodiments, immediately after sending a signal to the switching element 300 to open the contacts 308 and 310 and to close the contacts 312 and 314, the control unit 302 monitors the signal from the current sensor 318. If the electrical current in the conductor exceeds a current limit for a period of time that exceeds a time limit, a fault condition exists. In the event a fault condition is detected, the control unit 302 sends a signal to the switching element 300 to close the contacts 308 and 310 and open the contacts 312 and 314, and lights the fault indicator 116. This would expectedly occur, for example, when there is a very low resistance (e.g., a short circuit) in a device coupled to one of the normally open tab header connectors 104A and 104B.

In the embodiment of FIG. 4, the tab terminals "C" of the tab header connectors 104A and 104B are connected to one another via a jumper, and are not directly connected to the tab terminals "A" and "B" of the tab header connectors 104A and 104B that receive switched electrical power when the switching element 300 is enabled. The tab terminals "C" of the tab header connectors 104A and 104B and the jumper that connects them allow the motor start capacitor 342 (connected to the tab header connector 104A) to be properly connected to the motor 340 (connected to the tab header connector 104B).

It is noted that in the embodiment of FIG. 4, the tab terminal "A" of the tab header connectors 104A is unused. Elimination of unused terminals of the tab header connectors 104A-104E is possible and contemplated. For example, the unused tab terminal "A" of the tab header connector 104A may be eliminated. Accordingly, the tab header connector 104A need only have two tab terminals. Another embodiment might include additional headers for a motor load and start capacitor so two motors could be controlled with one relay.

In other embodiments, the relay 100 may include two additional tab header connectors similar to the tab header connectors 104A and 104B (each have three tab terminals "A," "B," and "C" from left to right). Tab terminals "B" and "C" of a first of the two additional tab header connectors may be connected to the tab terminals "A" and "B" of the tab header connectors 104A, respectively, via two jumpers. The three tab terminals "A," "B," and "C" of the second addition tab header connector may be connected to the corresponding "A," "B," and "C" tab terminals of the first additional tab header connectors 104A via three jumpers. Leads of a second motor may be connected to the three tab terminals of the first additional tab header connector, and leads of a second motor start capacitor may be connected to the "A" and "B" tab terminals of the second additional tab header connector.

Figure 5:
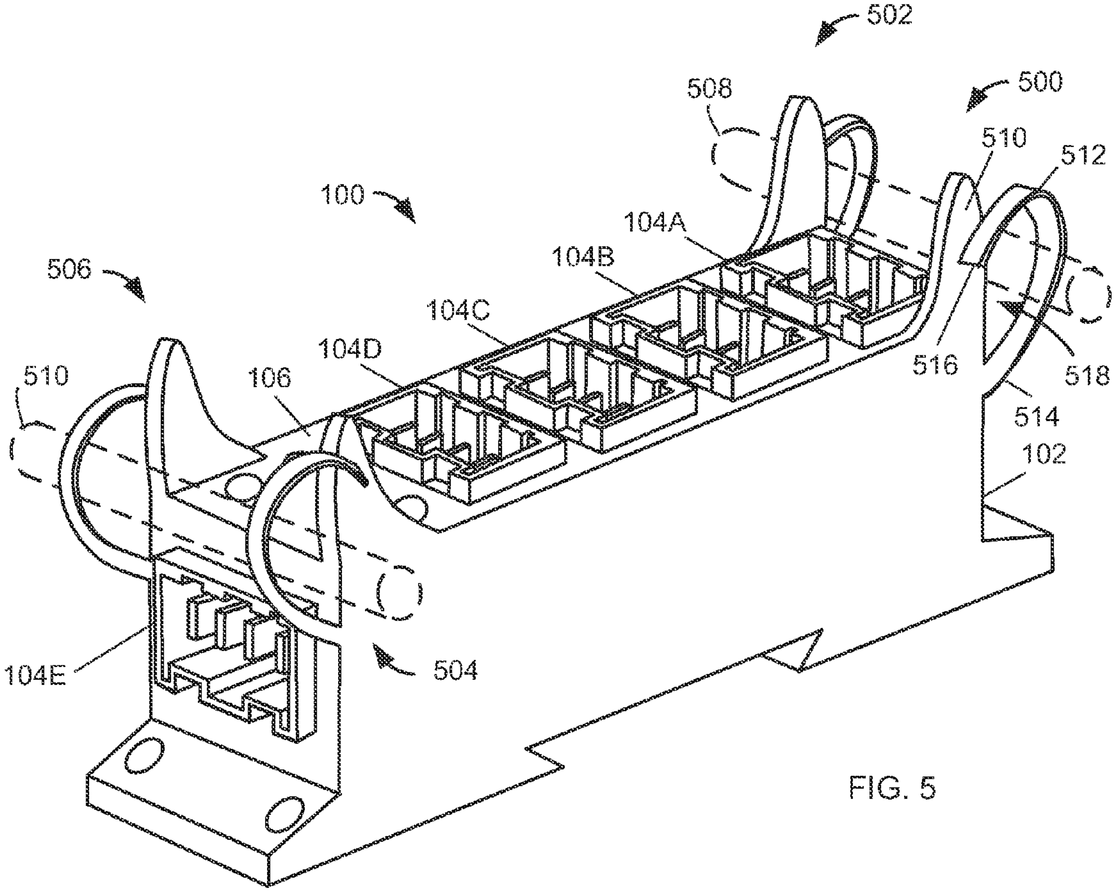
FIG. 5 is a perspective view of another embodiment of the relay of FIG. 1 having wire routing hooks.

FIG. 5 is a perspective view of another embodiment of the relay 100 of FIG. 1 having four wire routing hooks 500, 502, 504, and 506 located at upper corners of the relay 100 for capturing and holding two wire bundles 508 and 510. Components of the relay 100 shown in FIGS. 1-2 and described above are numbered similarly in FIG. 5. In the embodiment of FIG. 5, the wire routing hook 500 includes a horn 510 extending outwardly (upwardly) from the upper surface 106 of the housing 102, and a curved hook member 512 extending outwardly from a side corner of the housing 102 below the horn 510. A lower end 514 of the hook member 512 is attached to the side corner of the housing 102 below the horn 510. A lower portion of the hook member 512 curves outward away from the housing 102, and an upper portion of the hook member 512 curves back toward the housing 102. An upper end 516 of the hook member 512 either contacts or come close to a side surface of the horn 510. An opening 518 exists between the horn 510 and the hook member 512. The hook member 512 is preferably formed from a flexible and resilient material (e.g., a flexible and resilient plastic material).

To capture and hold a wire bundle, the upper end 516 of the hook member 512 is grasped and pulled away from the horn 510, the wire bundle is positioned between the hook member 512 and the horn 510, and the upper end 516 of the hook member 512 is released. When the hook member 512 returns to its original curved shape with the upper end 516 either in contact with or close to the side surface of the horn 510, the wire bundle is captured and held in the opening 518. The wire routing hooks 502, 504, and 506 are configured similarly. In FIG. 5, the wire bundle 508 is captured and held by the wire routing hooks 500 and 502, and the wire bundle 510 is captured and held by the wire routing hooks 504 and 506.

In other embodiments, the relay 100 may include circuitry for determining a condition of the motor start capacitor 342. The relay 100 may also include a terminal for providing a fault signal indicative of a detected fault condition. The relay 100 may also include circuitry for receiving and storing information that defines when a fault condition occurs. The relay 100 may also include circuitry determining amounts of electric current drawn by load devices connected one or more of the tab header connectors 104A-104C during operation, and transmitting signals indicative of the amounts of electric current. The relay 100 may also include circuitry for conveying a fault condition signal indicative of the amounts of electric current via the line conductors, thus eliminating the need for additional communication terminals. Alternately, the tab header connector 104E may include an additional tab terminal for conveying the fault conditional signal.

Numerous variations and modifications will become apparent to those skilled in the art once the above disclosure is fully appreciated. It is intended that the following claims be interpreted to embrace all such variations and modifications.

What is claimed is:

1. An electrical relay, comprising:

a line electrical terminal adapted for connection to an electrical conductor carrying an electrical voltage;

a normally-closed connector having a housing and a plurality of electrical terminals arranged within a cavity of the housing of the normally-closed connector;

a normally-open connector having a housing and a plurality of electrical terminals arranged within a cavity of the housing of the normally-open connector;

a switching element coupled to the line electrical terminal, the normally-closed connector, and the normally-open connector, and configured to:

electrically connect the line electrical terminal to at least one of the electrical terminals of the normally-closed connector when not enabled; and electrically connect the line electrical terminal to at least one of the electrical terminals of the normally-open connector when enabled;

wherein the normally-closed connector is mechanically coded to receive a plug connector that is connected to one or more crankcase heater devices; and wherein the normally-open connector is mechanically coded to receive a plug connector of an electric motor or a motor start capacitor.

2. The electrical relay as recited in claim 1, further comprising a control unit coupled to the switching element and adapted to receive a control signal and to enable the switching element in response to the control signal.

3. The electrical relay as recited in claim 1, wherein the terminals of the normally-closed connector and the normally-open connector are arranged in the cavity such that the terminals are recessed within the cavity with respect to an outer face ofthe connectors.

4. The electrical relay as recited in claim 1, wherein the electrical terminals of the normally-closed connector and the normally-open connector are tab terminals, and the normally-closed connector and the normally-open connector are tab header connectors.

5. The electrical relay as recited in claim 1, wherein the normally-closed connector and the normally-open connector conform to the Raster Anschluss Steck Tecknik (RAST) standard.

6. The electrical relay as recited in claim 1, wherein the line electrical terminal is a tab terminal of a tab header connector.

7. The electrical relay as recited in claim 1, wherein the line electrical terminal is a screw terminal or a box lug terminal.

8. The electrical relay as recited in claim 1, wherein the switching element comprises a pair of electrical contacts.

9. The electrical relay as recited in claim 1, wherein the switching element comprises a semiconductor device.

10. An electrical relay, comprising:

a pair of line electrical terminals each adapted for connection to an electrical conductor carrying an electrical voltage;

a normally-closed connector having a housing and four electrical terminals disposed within a cavity of the housing of the normally-closed connector;

a first normally-open connector and second normally-open connector each having three electrical terminals and each having a housing, wherein corresponding electrical terminals of the first normally-open connector and second normally-open connector are electrically connected to one another, wherein the three electrical terminals of the first normally-open connector are disposed with the cavity of the housing of the first normally-open connector and wherein the three electrical terminals of the second normally-open connector are disposed with the cavity of the housing of the second normally-open connector;

a switching element coupled to the line electrical terminals, the normally-closed connector, and the first normally-open connector and the second normally-open connector, and configured to:

electrically connect the line electrical terminals to two of the four electrical terminals of the normally-closed connector when not enabled; and electrically connect the line electrical terminals to two of the three electrical terminals of the first normally-open connector when enabled.

11. The electrical relay as recited in claim 10, further comprising a control unit coupled to the switching element and adapted to receive a control signal and to enable the switching element in response to the control signal.

12. The electrical relay as recited in claim 10, wherein the electrical terminals of the normally-closed connector and the first and second normally-open connectors are arranged within a cavity of a housing.

13. The electrical relay as recited in claim 10, wherein the electrical terminals of the normally-closed connector and the first and second normally-open connectors are tab terminals, and the normally-closed connector and the first and second normally-open connectors are tab header connectors.

14. The electrical relay as recited in claim 10, wherein the normally-closed connector and the first and second normally-open connectors conform to the Raster Anschluss Steck Tecknik (RAST) standard.

15. The electrical relay as recited in claim 10, wherein alternate ones of the four electrical terminals of the normally-closed connector are electrically connected together.

16. The electrical relay as recited in claim 10, wherein the normally-closed connector is mechanically coded to receive a plug connector that is connected to one or more crankcase heater devices.

17. The electrical relay as recited in claim 1, wherein the first normally-open connector is mechanically coded to receive a plug connector of an electric motor, and wherein the second normally-open connector is mechanically coded to receive a plug connector of a motor start capacitor.

18. The electrical relay as recited in claim 10, wherein a subset of the electrical terminals of the first and second normally-open connectors are connected to one another via jumpers and are not electrically connected any one of the line electrical terminals when the switching element is enabled.

* * * * *